(12) United States Patent
Yang et al.

(10) Patent No.: US 9,742,629 B2
(45) Date of Patent: *Aug. 22, 2017

(54) USER-CONTROLLED NETWORK CONFIGURATION FOR HANDLING MULTIPLE CLASSES OF SERVICE

(71) Applicant: AT&T Intellectual Property I, L.P., Atlanta, GA (US)

(72) Inventors: Chen-Yui Yang, Marlboro, NJ (US); Paritosh Bajpay, Edison, NJ (US); David H. Lu, Irving, TX (US); Anand Singh, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,634

(22) Filed: Aug. 10, 2015

(65) Prior Publication Data
US 2015/0350010 A1    Dec. 3, 2015

Related U.S. Application Data

(63) Continuation of application No. 12/411,879, filed on Mar. 26, 2009, now Pat. No. 9,106,539.

(51) Int. Cl.
*H04L 12/28* (2006.01)
*H04L 12/24* (2006.01)

(52) U.S. Cl.
CPC ...... *H04L 41/0883* (2013.01); *H04L 41/0803* (2013.01)

(58) Field of Classification Search
CPC .................. H04L 41/0883; H04L 41/0803
See application file for complete search history.

(56) References Cited

U.S. PATENT DOCUMENTS

| | | | |
|---|---|---|---|
| 6,587,463 | B1 | 7/2003 | Hebb et al. |
| 6,611,522 | B1 | 8/2003 | Zheng et al. |
| 6,778,498 | B2 | 8/2004 | McDysan |
| 7,230,917 | B1 | 6/2007 | Fedorkow et al. |
| 7,257,124 | B2 | 8/2007 | Goetzinger et al. |
| 7,289,498 | B2 | 10/2007 | Yu et al. |
| 7,724,740 | B1 | 5/2010 | Wang et al. |
| 2002/0049841 | A1 | 4/2002 | Johnson et al. |
| 2002/0064149 | A1 | 5/2002 | Elliott et al. |
| 2003/0016679 | A1 | 1/2003 | Adams et al. |
| 2003/0112755 | A1 | 6/2003 | McDysan |
| 2004/0032828 | A1* | 2/2004 | Satt .................. H04L 47/10 370/230 |

(Continued)

*Primary Examiner* — Nicholas Sloms
*Assistant Examiner* — Hai-Chang Hsiung
(74) *Attorney, Agent, or Firm* — Jackson Walker L.L.P.

(57) ABSTRACT

A network configuration method includes receiving end user input indicative of a network configuration. The end user input may include: a plurality of service classes, a particular packet header field for each of the plurality of service classes, and a particular service class mixture for the plurality of service classes. The particular service class may be indicated by a particular value of the particular packet header field. The method may further include configuring an ingress router to prioritize packets sent to the end user in accordance with the network configuration and configuring an egress router to queue network packets sent from the end user in accordance with the network configuration.

15 Claims, 6 Drawing Sheets

(56) References Cited

U.S. PATENT DOCUMENTS

| | | |
|---|---|---|
| 2004/0258003 A1* | 12/2004 | Kokot .................. H04L 12/185 370/254 |
| 2005/0177380 A1 | 8/2005 | Pritchard et al. |
| 2005/0198295 A1 | 9/2005 | Turkoglu |
| 2006/0165103 A1 | 7/2006 | Trudeau et al. |
| 2006/0239288 A1 | 10/2006 | Posey, Jr. |
| 2007/0165638 A1 | 7/2007 | Hasani et al. |
| 2007/0253438 A1* | 11/2007 | Curry ..................... H04L 47/10 370/412 |
| 2009/0013175 A1 | 1/2009 | Elliott |
| 2009/0097490 A1* | 4/2009 | Sanderson .......... H04L 63/0272 370/395.53 |
| 2009/0144764 A1 | 6/2009 | Mehta et al. |
| 2010/0125853 A1 | 5/2010 | Qian et al. |
| 2010/0161770 A1 | 6/2010 | Ferro et al. |

* cited by examiner

USER-CONTROLLED NETWORK CONFIGURATION FOR HANDLING MULTIPLE CLASSES OF SERVICE

This application is a continuation of U.S. patent application Ser. No. 12/411,879, filed Mar. 26, 2009, issuing as U.S. Pat. No. 9,106,539 on Aug. 11, 2015, the entirety of which is incorporated by reference herein.

BACKGROUND

Field of the Disclosure

The present disclosure relates to network configuration and, more particularly, to configuring networks for handling multiple classes of service.

Description of the Related Art

Configuring packet-switched networks for bandwidth, latency or security is typically desired. Such configuration may be performed by a service provider of the network.

DESCRIPTION OF EXEMPLARY EMBODIMENTS

Many entities use some form of wide-area network (WAN) to communicate and exchange data between different locations. For example, a business entity with branch offices in different cities may desire that each location be equipped with internal and external network connectivity, while sharing common functionality and applications. One WAN solution is a virtual private network (VPN), which allows a secured, private WAN to be configured using public backbone infrastructure to access specific locations. In some instances, a public network, such as the Internet, may comprise at least a portion of an Intenet-protocol (IP) network used as a WAN. Each location serviced by a WAN may include a local-area network (LAN), such that the WAN effectively bridges remote LAN or other network segments.

With the advent of IP-networks, IP-based multimedia network services may be combined using the same network infrastructure. For example, IP-networks may be used to transmit video, along with email and telephony services, such as voice-over-IP (VOIP), to serve business needs for modern digital communication on a single network platform. Since IP-networks are ubiquitous, the underlying IP-network infrastructure may operate totally transparent to user-level LANs, providing the appearance of a much larger network system.

With increasing demands on network performance, network configuration and flexibility of use, the immediate and tailored configuration of a network, such as an IP-network, becomes an important feature for an administrator or user of the network. A network service provider offering network services, such as an IP-network, may also provide the capability and resources to reconfigure the network according to the properties desired by their customers. However, as the demand for network configuration services increases, the availability of technical resources, such as network engineers, may remain constrained. The process of obtaining network configuration services may further be cumbersome, time-consuming, and error-prone. In some instances, users may desire to constantly reconfigure their networks for changing performance demands on an as-needed basis.

In one aspect, a disclosed method for configuring an IP network includes generating a network configuration based on a first user input. Generating the network configuration may include building a network profile for prioritizing network packets sent to the network. The network profile may define a plurality of classes of service (COSs), while at least one of the COSs may be defined according to a packet parameter. Generating the network configuration may further include building a queuing profile for scheduling network packets received from the network based on the network profile, whereby the received network packets may be scheduled according to the network profile, and notifying a network service provider of the network configuration. The method may further include implementing the network configuration on the network, whereby packet prioritization on the network may comply with the network profile. The first user input may be received by a user-operated network configuration system.

In some embodiments, the first user input may be sent to the network service provider for validation, whereby said implementing may be performed in response to the network service provider indicating validation of the first user input. The method may further include transmitting network packets over the network. The packet parameter of transmitted network packets may establish a desired class of service. At least a portion of the transmitted network packets may represent a stream of video data. The network may be an IP-network. In some cases, the first user input may be validated based on at least one of a service contract with the service provider and an analysis for errors in the network configuration.

In some examples, the packet parameter may be at least one of an IP Precedence value, a Differentiated Services Code Point (DSCP) value, a source IP address, and a destination IP address. The transport level protocol may be User Datagram Protocol (UDP) or Transmission Control Protocol (TCP), whereas the packet parameter may be specified for at least one of a source and a destination. The packet parameter may be a combination of at least one IP network address and at least one corresponding port for each IP network address.

In some cases, the method may further include monitoring the network with respect to the network profile, whereby said monitoring includes comparing a measured quality of service (QOS) to a desired COS in the network profile.

In certain embodiments, the method may further include generating a network topology based on the network configuration. Generating the network topology may further include recording a network profile for each of a respective plurality of network ingress links, and recording a queuing profile for each of a respective plurality of network egress links. The network may be an IP-network operated by the network service provider. The ingress and egress links may couple an external network system to the IP-network.

In some embodiments, the method may further include receiving a request for a network report, including receiving second user input specifying at least a portion of the network configuration, generating the network report based on the specified portion of the network configuration, and providing user access to the network report. The network report may include information on at least one of network performance, network QOS, network disruptions, network condition, and network traffic. In some cases, implementing the network configuration may further include dropping packets received at an ingress link of the network that do not conform to the network profile, based on the COS for each received packet.

In another aspect, a disclosed service for user-controlled network configuration of an IP-network, includes enabling a user to provide input for generating a network configuration for the IP-network, notifying a service provider of the IP-network that the user input has been received, and validating the user input based on a service contract with the service provider. Generating the network configuration may include building a network profile for prioritizing IP packets sent to the IP-network, wherein the network profile includes a plurality of COSs, and wherein each COS is respectively classified according to a packet parameter. Generating the network configuration may further include building a queuing profile for scheduling IP packets received from the IP-network based on the network profile, wherein the received IP packets are queued according to the network profile.

The service may further include modifying the service contract based on the user input. The user input may further be validated based on an analysis for errors in the network configuration. When the customer input is validated by the service provider, the service may further include implementing the network configuration on the IP-network. Implementing the network configuration may further include configuring routing devices on the IP-network to respond to the classified packet parameter of each received IP packet to implement the corresponding COS. The IP-network may be a Multi Protocol Label Switching (MPLS) network, while at least some of the routing devices may be Label Edge Routers (LERs).

In a further aspect, a disclosed system for configuring an IP network includes a processor, and memory media accessible to the processor, including processor executable instructions for implementing a user-controlled network configuration system. The instructions may be executable to receive user input for defining a network profile including a plurality of COSs for prioritizing network packets sent to the network, wherein each COS corresponds to a respective packet parameter, and define a queuing profile for scheduling network packets received from the network based on the network profile, wherein the received network packets are scheduled according to the network profile. The instructions may further be executable to generate a network configuration based on the network profile and the queuing profile.

In some embodiments, instructions may still further be executable to notify a network service provider of the network configuration, whereby the user input may be sent to the network service provider for validation. When the customer input is validated by the service provider, the instructions may be executable to implement the network configuration on the network, such that packet routing devices on the network may be configured to prioritize routing of network packets based on the packet parameter of transmitted network packets.

In yet a further aspect, a disclosed computer-readable memory media includes processor executable instructions for configuring a portion of an IP-network based on user-provided input. The instructions included in the memory media may be executable to receive user input for defining a network profile for prioritizing network packets sent to the IP-network, the network profile including a plurality of COSs, and implement an IP-network configuration based on the network profile and the queuing profile. Each COS may correspond to a packet parameter, while said prioritizing may be based on the packet parameter.

In some embodiments, the instructions may be executable to define a queuing profile for scheduling network packets received from the IP-network based on the network profile, such that the received network packets are scheduled according to the network profile. The instructions executable to implement the IP-network configuration may include instructions executable to configure routing devices on the IP-network. The memory media may further comprise instructions executable to configure ingress routing devices on the IP-network to assign a network priority to a received network packet, based on a packet parameter value of the received network packet, and configure egress routing devices on the IP-network to queue the network packet exiting the IP-network for scheduling according to the assigned network priority. The memory media may still further comprise instructions executable to drop a received network packet at an ingress routing device of the IP-network that does not conform to the network profile, based on the COS for the received packet.

In the following description, details are set forth by way of example to facilitate discussion of the disclosed subject matter. It should be apparent to a person of ordinary skill in the field, however, that the disclosed embodiments are exemplary and not exhaustive of all possible embodiments.

A network profile, as used herein, refers to a specification defining different COSs for prioritizing network traffic. Different regimes for the number of levels of COSs may be implemented. One example using six-levels of COS values is as follows:

COS1 real-time (VOIP);
COS2 mission-critical data (video);
COS3 critical application data (database);
COS4 business data (web traffic);
COS5 standard data (email, ftp); and
COS6 other data.

Each level of COS may be assigned to a specified network performance, or a performance range. In the above example, as the COS value decreases, network priority increases, such that network bandwith increases and latency generally decreases. It is noted that the six-level COS regime shown above is exemplary, and that COS regimes with less or more levels of service may be implemented in other situations.

In one example application, the transmission of video may be viewed as a mission-critical network operation involving a broadcaster sending programming to a receiver at a remote location, such that the latency of arriving video data may be constrained to a limited value. Video transmission over IP-networks may thus involve a lower tolerance to network errors than other kinds of TCP/IP data. Therefore, if the transmission of video data as a smooth, continuous stream is desired, a higher performance class of service may be selected. In some cases, COS1 and COS2 may be the values, which are capable of transmitting video data streams within an acceptable margin of error.

A network profile may be comprised of a weighted mixture of different COSs, depending on particular traffic patterns or business requirements of the user. Following the above example for COSs, an exemplary network profile may be assembled as follows:

5% COS1;
15% COS2;
25% COS3;
20% COS4;

30% COS5; and

5% COS6.

Thus, a network profile represents a desired profile for the prioritization of a total amount, i.e., 100%, of network traffic, for example, transmitted over an IP-network. It is noted that the weighting of different COSs within a profile may vary widely in different instances and usage scenarios. Although in the above example, the amount of traffic is shown as a relative percent of the total traffic, in other cases, the network traffic for each COS in a network profile may also be specified using other values, such as but not limited to, amount of data, rate of data, number of connections, media type, or a combination of values. The network service provider of the IP-network may offer different rates, or prices, for different COSs, such that economic criteria may also affect the selection of a desired network profile, or a particular regime for specifying the network profile.

Once the desired COSs in the network profile have been established, the network infrastructure may be programmed to implement the prioritization scheme set out in the network profile. In the case of an IP-network, prioritization of network traffic may be enforced at the packet level using a packet parameter. A packet parameter in the packet header may be detected by a network routing device and used to enforce the network profile, as will be described in detail below.

Implementing the network profile on the network may include programming ingress routing devices, which receive network traffic, to enforce the COSs defined by the network profile. Incoming packets not conforming to the network profile may be dropped by an ingress routing device. Egress routing devices may be configured according to a queuing profile, which is based on the network profile, for scheduling packets emerging from the network. Thus, even if the network transmits received packets at a higher rate than specified in the network profile, the egress routing device may hold packets to satisfy a COS.

Figure 1:
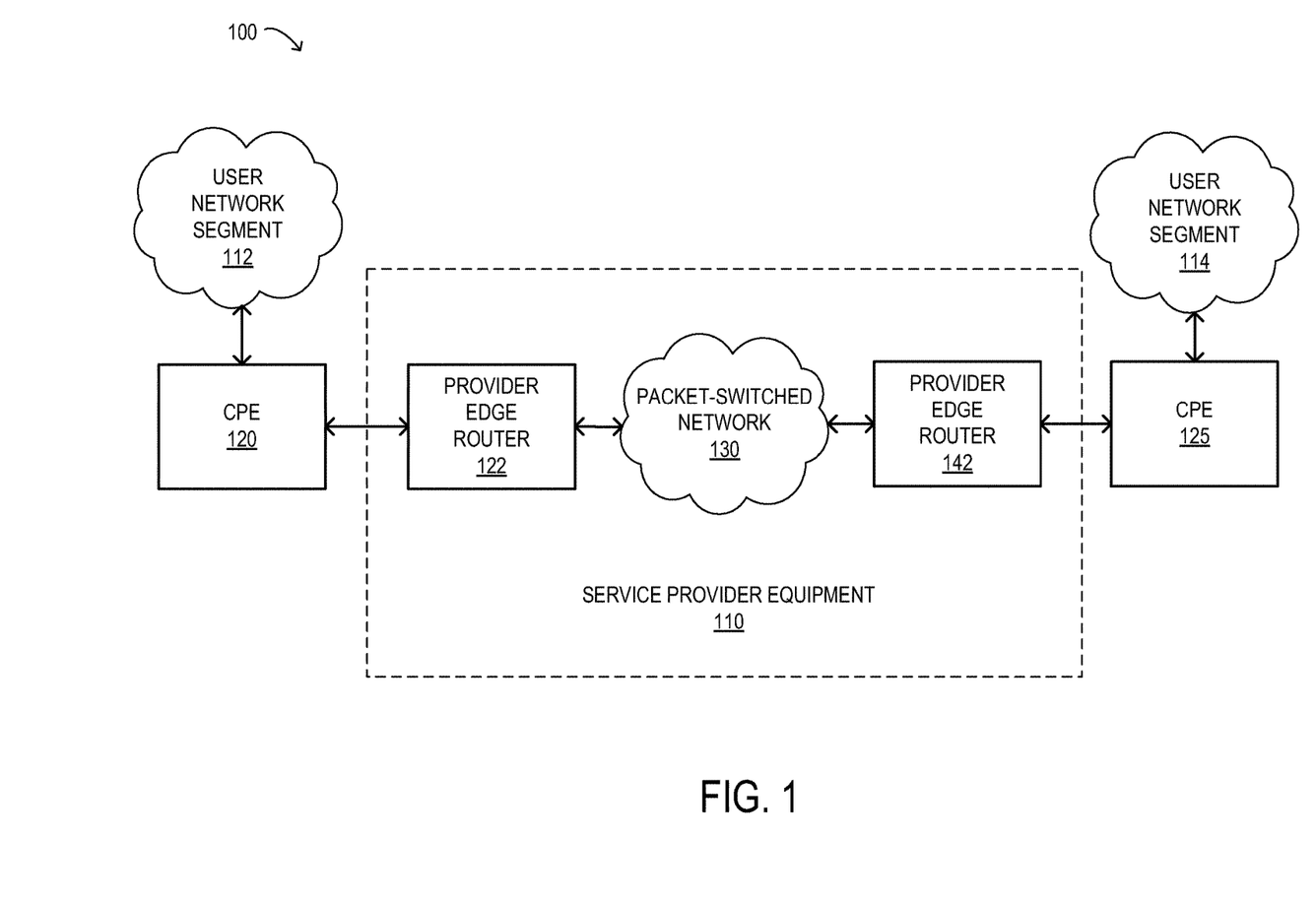
FIG. 1 illustrates an IP network.

Referring to FIG. 1, a block diagram of selected elements of an embodiment of IP-network 100 is illustrated. IP-network 100 may be configured to link user network segment 112 with user network segment 114. In some embodiments network segments 112 and 114 represent LANs belonging to the same business entity, but at different locations. As shown in FIG. 1, IP-network 100 bridges two user network segments 112 and 114. However in different embodiments, a plurality of user network segments (not shown in FIG. 1) may be interconnected to IP-network 100 using combinations and replication of equipment depicted therein as well as other equipment not depicted.

As referred to herein, a "user" may be an administrator of user network segments 112 and 114, and may be responsible for network configuration. In other instances, "user" may be the user or customer of a network service. In some cases, user network segments 112 and 114 are IP-networks serving a plurality of clients at each location (not shown in FIG. 1). In certain embodiments, user network segments 112 and 114 are further bridged or interconnected with other public or private networks, such as the Internet, wireless networks, telephony networks, etc. (not shown in FIG. 1).

User network segment 112 may be coupled to provider edge router 122 via customer-premises equipment (CPE) 120, which may include an ingress router, an egress router, or a device that provides combined ingress and egress functionality. Similarly, user network segment 114 may be coupled to provider edge router 142 via CPE 125, may include an ingress router, an egress router, or a device that provides combined ingress and egress functionality. CPE 120 and 125 may be responsible for receiving network traffic from user network segments 112 and 114, respectively, and for sending network traffic to user network segments 112 and 114, respectively.

As shown in FIG. 1, user network segment 112 and CPE 120 may represent equipment at a first location, while user network segment 114 and CPE 125 may represent equipment at a second location. CPE 120 and 125 may be provided by a service provider of IP-network 100, who may also provide service provider equipment 110. Service provider equipment 110 may include provider edge routers 122 and 142, and packet-switched network 130. In some embodiments of IP-network 100, provider edge routers 122 and 142 may be co-located with CPE, or combined with CPE as a single piece of equipment (not shown in FIG. 1). In some cases, provider edge routers 122 and 142 provide network services for a plurality of IP-networks to different business entities, which may each operate a plurality of network segments at different locations.

In FIG. 1, provider edge routers 122 and 142 include bidirectional routing functionality to and from packet-switched network 130, which may represent the backbone system for IP-network 100. As mentioned above, packet-switched network 130 may itself be any combination of private and public networks, such as the Internet. In one embodiment, packet-switched network 130 may be an MPLS network, while provider edge routers 122 and 142 are LERs for the MPLS, capable of translating between an MPLS protocol and an external protocol. Packet-switched network 130 may further include a plurality of internal routing devices (not shown in FIG. 1). Although packet-switched network 130 is shown included in service provider equipment 110 in FIG. 1, packet-switched network 130 may include third-party equipment or network segments, for example, network routing devices, acquired by the service provider of IP-network 100.

In one embodiment, IP-network 100, as shown in FIG. 1, once configured according to a desired network profile by a user, may transmit packets between user network segments 112 and 114. In one example of transmission of network traffic from user network segment 112 to user network segment 114, network packets may be received at CPE 120 from user network segment 112. CPE 120 may enforce the desired network profile by dropping network packets not conforming to the network profile. The conforming network packets may be routed via provider edge router 122, transmitted by packet-switched network 130 to provider edge router 142, and sent to CPE 125. The network packets may be queued by CPE 125 and scheduled for transmission to user network segment 114 when they comply with the network profile. A similar, complementary arrangement may be used for transmitting network packets in the reverse direction in IP-network 100.

Figure 2:
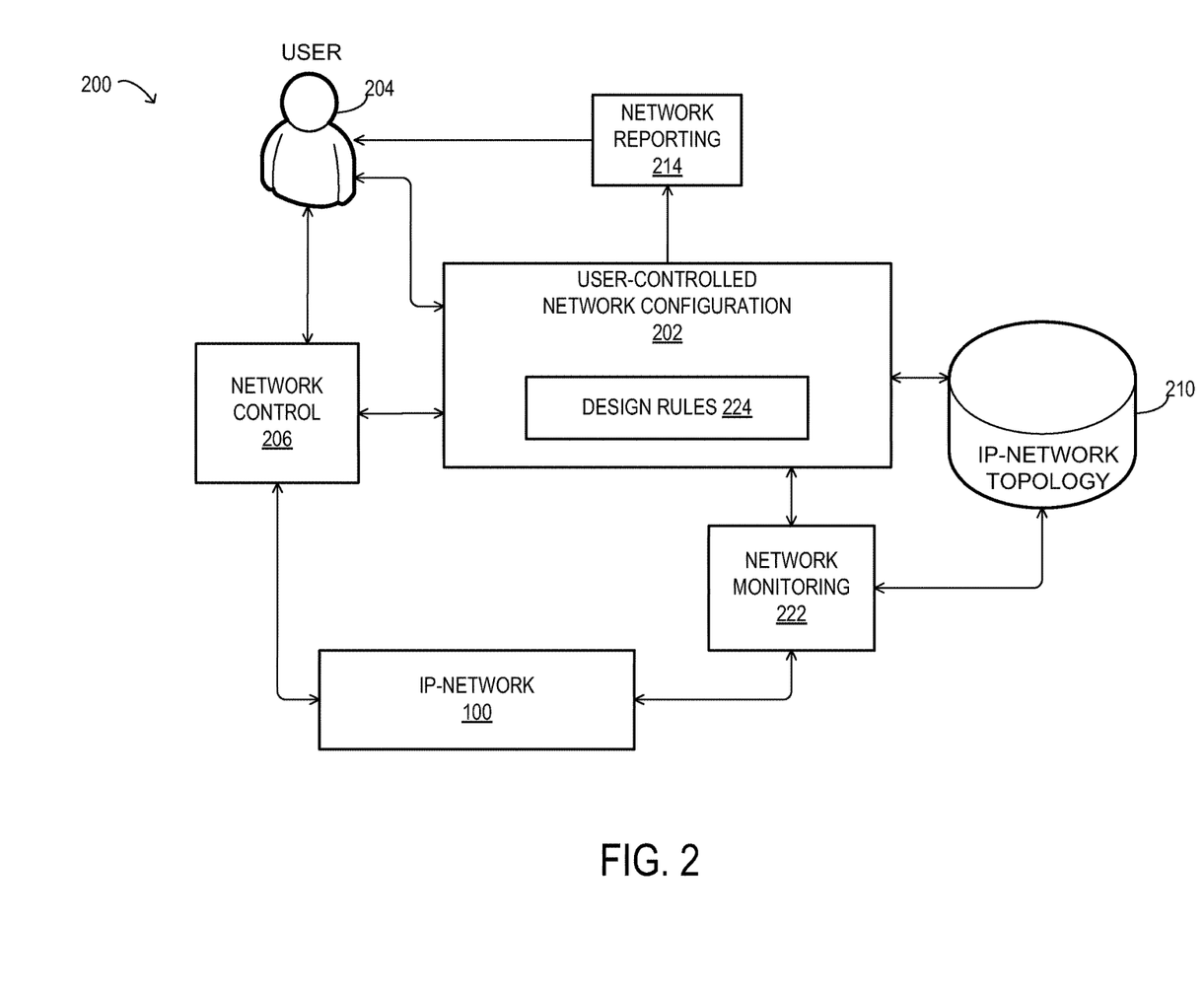
FIG. 2 illustrates a network configuration system.

Referring now to FIG. 2, a block diagram of selected elements of an embodiment of a network configuration system 200 is illustrated. Network configuration system 200 may represent a modular architecture, which provides customer-access in real time. For example, a customer may provide user input using network configuration system 200 to create a desired network profile, including high-priority COSs capable of video transmission, to support video services such as video call, personal and business videoconferencing, and video broadcasting. Network configuration system 200 may allow the customer to build COS profiles, manage IP-network topology database 210 for customer-specific ingress and egress links, and monitor network performance, for example, with respect to video transmission, using network monitoring 222.

As shown in FIG. 2, a user-controlled network configuration module 202, referred to herein as "configuration module" 202, is coupled to IP-network 100 (see FIG. 1), and may be used to implement a network profile for IP-network 100. Configuration module 202 may receive input from user 204 for generating and implementing a desired network profile. User 204 may be an administrative user of IP-network 100 who has been provided administrative access to configure and implement desired network profiles on IP-network 100 by accessing configuration module 202. User 204 may thus represent a customer of a business entity providing communication services, including access to IP-network 100 and configuration module 202.

Configuration module 202 may further validate user input for correctness, and/or check a service contract to determine whether the customer will be allowed to implement a desired COS. In some instances, configuration module 202 may notify the user when a contract issue arises to modify or confirm amended contract provisions. Configuration module 202 may then provide user input, such as a desired network profile, to design rules 224 for implementation of the network profile, as will be discussed below.

Configuration module 202, as shown in FIG. 2, may further be coupled to network control 206, which may also directly be contacted by user 204. Network control 206 may represent network control operations, including a support organization, for the service provider of IP-network 100, and may be equipped to implement network profiles on IP-network 100, as well as validate and/or modify user-generated network profiles. Configuration module 202 may further intiate contact to network control 206 for specialized processing of a network profile request, for example, when an automated user-controlled implemenation was not completed.

Implementation of a network profile on a network, such as IP-network 100, may involve provisioning and policing operations performed by network control 206. Provisioning the network may involve programming packet-routing devices on the network, such as routers (see FIG. 1), to forward network traffic according to traffic classification rules, such as defined by a network profile. Policing operations performed by network control 206 may include monitoring traffic for each COS in a network profile, marking non-compliant packets, and dropping packets exceeding individual COS profile. Policing and scheduling operations may be implemented by network control 206 in a CPE router, such as CPE router 120, or in a provider edge (PE) router, such as router 122 (see FIG. 1).

In some embodiments, network control 206 includes a call center staffed by operators and qualified technical experts for providing support to user 204. In some cases, network control 206 represents the service provider of IP-network 100 for business issues, such as billing, terms of service contracts, payment, technical support, equipment supply and installation, etc. In certain embodiments, network control 206 may be operated by a third-party on behalf of the service provider of IP-network 100.

As shown in FIG. 2, configuration module 202 may include design rules 224, which assist in providing options for COSs and network profiles to user 204. Design rules 224 may include implementation rules, such as logic, policies, or expert intelligence, for COS regimes offered by the service provider of IP-network 100, corresponding to the options provided to user 204 for configuring network profiles. In some cases, design rules 224 may be used to determine whether a desired network profile input by user 204 is valid for implementation on IP-network 100. Design rules 224 may include implementation policies for ingress routers configuration (i.e., policing and marking), as well as egress router configuration (i.e., scheduling or queuing). Design rules 224 may accordingly include information specifically indicative of how a network profile with different COSs is to be implemented on ingress and/or egress routing devices of IP-network 100.

For ingress routing devices, design rules 224 may specify that packets exceeding the allocated bandwith are strictly policed (i.e., traffic above the allocated bandwidth is discarded) for each COS in the implemented network profile. For egress routing devices, design rules 224 may enforce a scheduling (or queuing) profile, which corresponds to the COSs in the network profile. A different queuing profile and egress buffer may be configured for each COS in the network profile. If there is congestion (i.e., buffer overflow) at an egress router for a given COS, non-compliant packets may be discarded. In this manner, upstream applications may be allowed to throttle down their transmission traffic levels, for example, when the TCP is used as a network protocol.

Also shown in FIG. 2 is IP-network topology 210, which may be a data store for configuration information associated with IP-network 100. In some embodiments, IP-network topology 210 stores network profiles for a plurality of network ingress links, and queuing profiles for a plurality of network egress links. IP-network topology 210 may also store additional network connectivity information for network links, such as routing and/or switching devices, for IP-network 100. In some cases, IP-network topology 210 may be used to generate specific configuration information for network equipment in IP-network 100, based on a network profile for a given set of ingress and egress links. Accordingly configuration module 202 may access IP-network topology 210 for obtaining user-specific information used in generating user input options, and for implementing a network profile on IP-network 100 generated using user input.

Still further shown in FIG. 2 is network monitoring 222, which may be coupled to configuration module 202, IP-network topology 210, and IP-network 100. Network monitoring 222 may be configured to test and measure actual network performance, and thus maintain information on the current condition of IP-network 100. Network monitoring 222 may monitor network traffic to determine when and where network disturbances occur. Network monitoring 222 may also perform quality of service (QOS) testing for quantitative and statistical evaluation of the end-to-end performance of IP-network 100.

In FIG. 2, user 204 may access network reporting 214 to generate reports on network performance, network disruptions, network conditions and network traffic. In one embodiment, a user may specify a given COS in a currently implemented network profile, and then obtain a report on QOS for that COS on IP-network 100. In this manner, user 204 is enabled to verify that the network profile generated and implemented using user input is actually performed as expected. Configuration module 202 may provide network reporting 214 with information to generate reports that quantify the deviation in performance between a desired COS and a measured QOS. In one embodiment, configuration module 202 obtains QOS testing results obtained from network monitoring 222 and provides these to network reporting 214.

TABLE 1

Example of QoS Testing Results in a Report

| Criteria | Requested/ Contract | Network Section 1 | Network Section 2 | Network Section 3 | Estimated End to End |
|---|---|---|---|---|---|
| Mean Transfer Delay (IPTD) | <100 ms | 42.4 ms | 20.6 ms | 42.4 ms | 105.4 ms |
| 99.9% - min Delay Var. (IPDV) | <50 ms | 25 ms | 2 ms | 25 ms | 47.5 ms |
| Minimum Transfer Delay | — | 30 ms | 20 ms | 30 ms | — |
| Variance of Transfer Delay | — | 52.4 ms | 0.23 ms | 55.1 ms | — |
| Loss (IPLR) | $<10^{-3}$ | $10^{-4}$ | $10^{-4}$ | $10^{-4}$ | $3 \times 10^{-4}$ |
| Errored Packets (IPER) | $<10^{-4}$ | $3 \times 10^{-5}$ | $3 \times 10^{-5}$ | $3 \times 10^{-5}$ | $9 \times 10^{-5}$ |

In Table 1, above, an example of QoS testing results that may be used in an embodiment of a report on network performance is illustrated. The Criteria in the first column of Table may represent desired transmission properties for a given COS. In the second column, Requested/Contract, the range of acceptable values, in terms of limits or threshold values (such as values specified by a contract for network services), may be presented for the corresponding transmission properties in the first column. It is noted that some transmission properties may not have an entry in the second column. It is also noted that the values in the second column may represent target values within an allowable range of error or a variance. In the third, fourth and fifth columns, actual measured values for three network subsequent sections are presented. In the last column, actual measured values for the end-to-end network, including the three subsequent sections, is presented.

Figure 3:
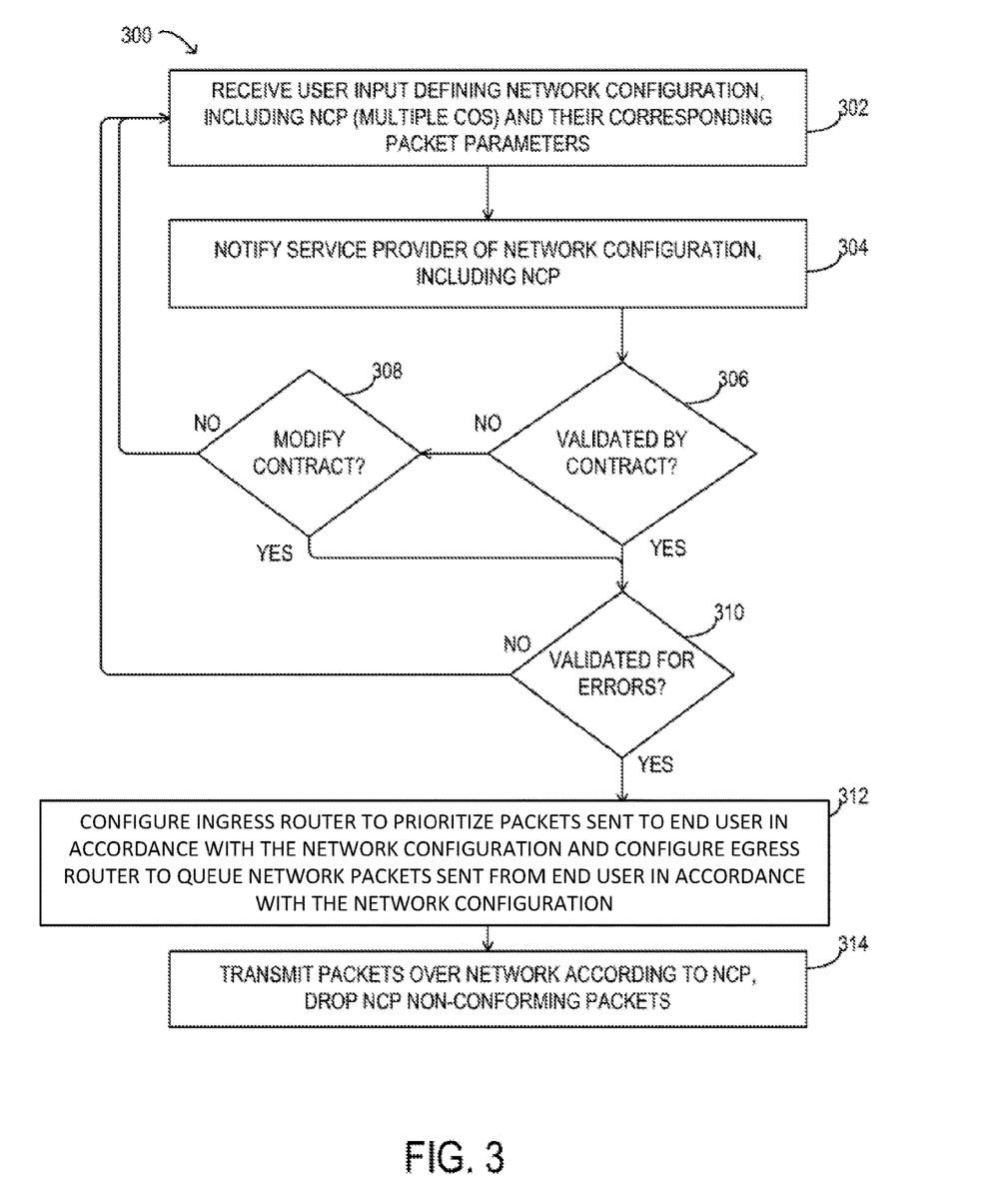
FIG. 3 illustrates elements of a network configuration process.

Referring now to FIG. 3, a block diagram of selected elements of an embodiment of a network configuration process 300 is depicted. In one embodiment, configuration module 202 (see FIG. 2) is configured to execute process 300. User 204 may provide input or commands for guiding and facilitating the execution of process 300, based on a service contract with a service provider of IP-network 100.

Accordingly, user input defining a network configuration, including a network profile of multiple COSs along with corresponding packet parameters, is received (operation 302). User 204 may specify different kinds of packet parameters to define COSs in operation 302, as will be discussed in detail below (see FIG. 5). A desired network profile may be specified for IP-network 100 using a user-interface provided to user 204 in operation 302. In addition to the network profile, the network configuration may define access points and locations for connection using IP-network 100. The service provider (for IP-network 100) may be notified of the network configuration, including the desired network profile (operation 304). A decision is made whether or not the network configuration, including the network profile, is validated by the service contract (operation 306). If the result of operation 306 is NO, then a further decision is made whether or not to modify the service contract (operation 308). If the result of operation 308 is NO, then process 300 returns to operation 302. If the result of operation 306 is YES, or the result of operation 308 is YES, then a further decision is made whether or not the network configuration, including the network profile, has been validated for errors (operation 310). If the result of operation 310 is NO, then process 300 returns to operation 302.

If the result of operation 310 is YES, then the network configuration is implemented, and ingress routing devices in IP-network 100 are configured to prioritize network packets sent to end users according to the network configuration and egress routers in IP-network 100 are configured to queue network packets sent from end users according to the network configuration (operation 312). In some embodiments, a queuing profile for scheduling packets from IP-network 100 is generated based on the network profile in operation 312. Ingress routing devices may be configured according to the network profile and egress routing devices may be configured according to the queuing profile in operation 312, as will be described in further detail below (see FIG. 4). Packets may be transmitted over the network according to the network profile, such that non-conforming packets are dropped (operation 314). In one embodiment, non-conforming packets are dropped by ingress routing devices to enforce the network profile in operation 314.

Figure 4:
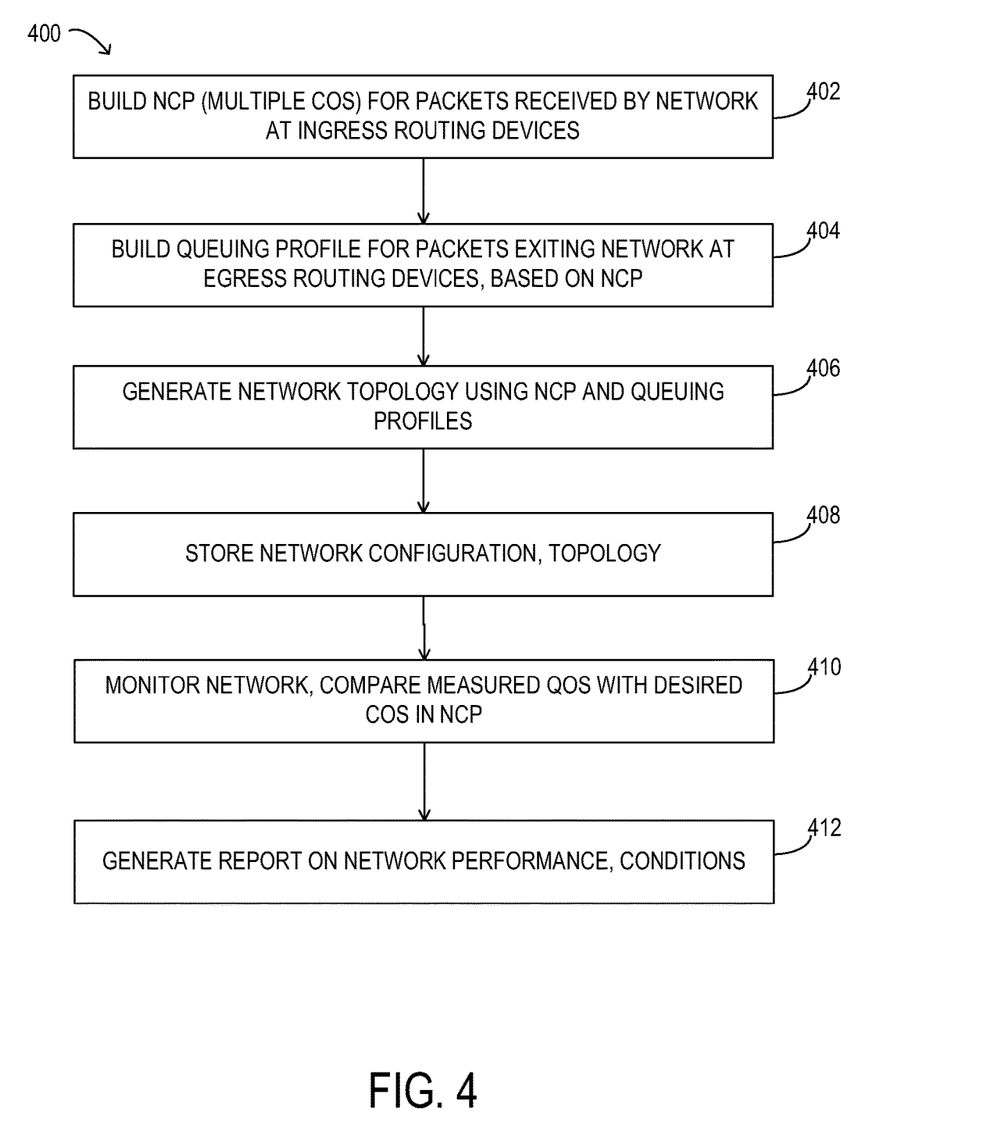
FIG. 4 illustrates elements of a network configuration process.

Turning now to FIG. 4, a block diagram of selected elements of an embodiment of a network configuration process 400 is illustrated. In some embodiments, process 400 represents operations that are performed during operation 314 in process 300 (see FIG. 3). Configuration module 202 (see FIG. 2) may be configured to execute process 400 using input from user 204.

A network profile, including multiple COSs, for packets received by the network (such as IP-network 100) at ingress routing devices is built (operation 402). Based on the network profile, queuing profiles for packets exiting the network at egress routing devices are built (operation 404). The queuing profiles may define how received packets are held until scheduled for release, such that traffic transmitted by IP-network 100 conforms to the network profile. A network topology may be generated using the network profile and queuing profiles (operation 406). In some cases, the network topology includes network profiles for a plurality of network routing devices. The network configuration and the network topology may be stored (operation 408). The network may be monitored and a measured QOS may be compared with a desired COS in the network profile (operation 410). In some embodiments, the network configuration may be further modified if the resulting network performance is inadequate (not depicted). A report may be generated on network performance and network conditions (operation 412). In some embodiments, the report includes the QOS comparison generated in operation 410.

Figure 5:
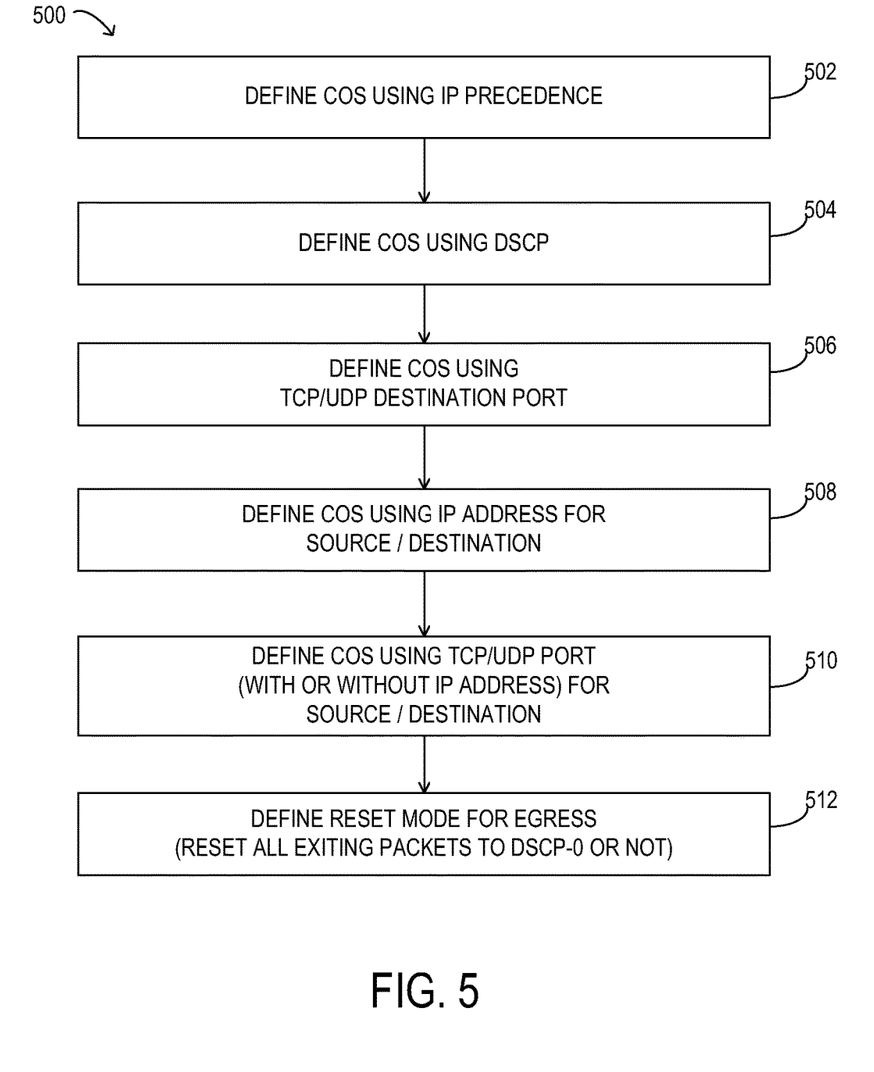
FIG. 5 illustrates elements of a network configuration process.

Referring now to FIG. 5, a block diagram of selected elements of an embodiment of a network configuration process 500 is illustrated. In some embodiments, process 500 represents operations that are performed during operation 404 in process 400 (see FIG. 4). Configuration module 202 (see FIG. 2) may be configured to execute process 500 using input from user 204. Process 500 describes packet parameters that may be used to define a COS in the network profile. It is noted that certain operations illustrated in process 500 may be omitted or selectively combined in different implementations.

A COS may be defined using IP Precedence values (operation 502). IP Precedence is a 3-bit field in an IP packet header that may be used as a packet parameter to identify the COS a packet receives in the network. A COS may be defined using a DSCP (operation 504). A DSCP is a 6-bit field in an IP packet header that may be used as a packet parameter to identify the COS a packet receives in the network. A COS may be defined using a TCP/UDP destination port (operation 506). When using TCP/UDP protocols, the destination port field may serve as a packet parameter as defined in operation 506. A COS may be defined using an IP address for the source and/or destination (operation 508). The IP source or destination address may be used as a packet parameter as specified in operation 508. A COS may be defined using a TCP/UDP port, either with or without an IP address, for the source and/or destination (operation 510). When using TCP/UDP protocols, combinations of IP address and port fields, for sources and/or destinations, may be used as packet parameters in operation 510. A reset mode at network egress may be defined, such that all exiting packets may be reset to a DSCP-0 value, or not (operation 512).

Figure 6:
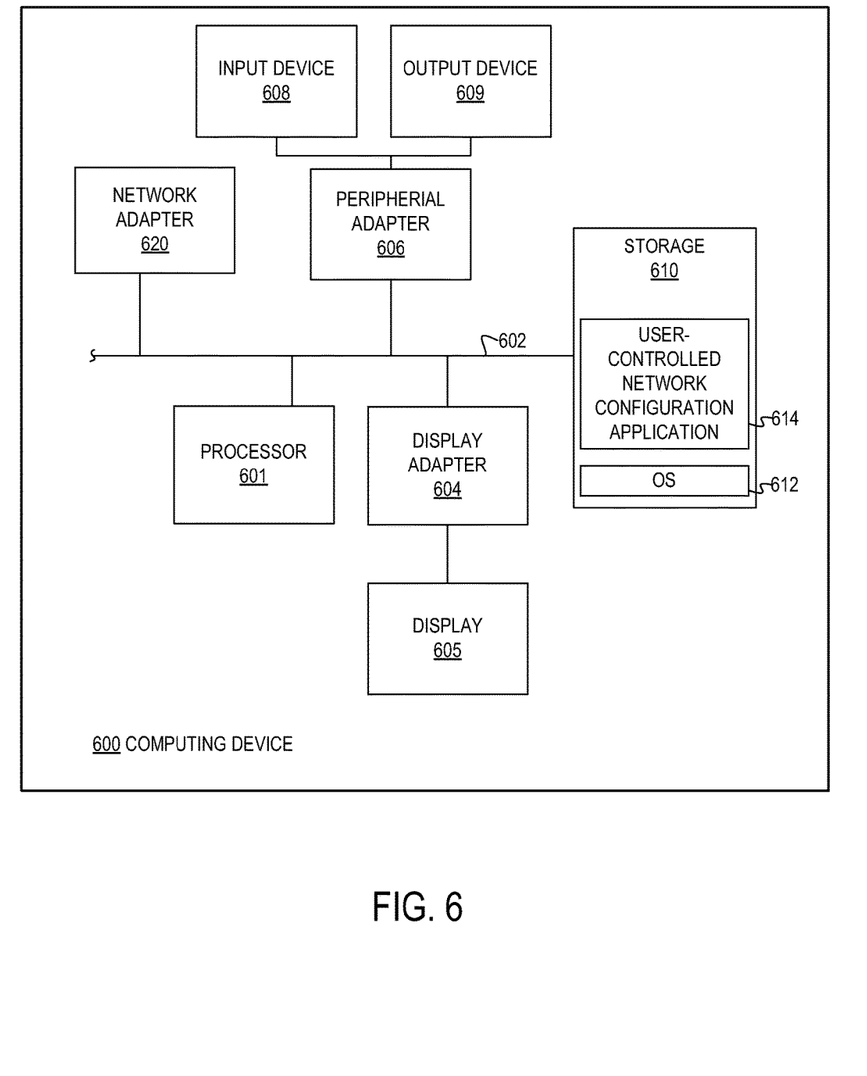
FIG. 6 illustrates a computing device.

Referring now to FIG. 6, a block diagram illustrating selected elements of an embodiment of a computing device 600 is presented. In the embodiment depicted in FIG. 6, device 600 includes processor 601 coupled via shared bus 602 to storage media collectively identified as storage 610.

Device 600, as depicted in FIG. 6, further includes network adapter 620 that interfaces device 600 to a network (not shown in FIG. 6). In embodiments suitable for user-controlled network configuration, device 600, as depicted in FIG. 6, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals.

Device 600 is shown in FIG. 6 including display adapter 604 and further includes a display device or, more simply, a display 605. Display adapter 604 may interface shared bus 602, or another bus, with an output port for one or more displays, such as display 605. Display 605 may be implemented as a liquid crystal display screen, a computer monitor, a television or the like. Display 605 may comply with a display standard for the corresponding type of display. Standards for computer monitors include analog standards such as video graphics array (VGA), extended graphics array (XGA), etc., or digital standards such as Digital Video Interface (DVI), High-Definition Multimedia Interface (HDMI), among others. A television display may comply with standards such as National Television System Committee (NTSC), Phase Alternating Line (PAL), or another suitable standard. Display 605 may include an output device 609, such as one or more integrated speakers to play audio content, or may include an input device 608, such as a microphone or video camera.

Storage 610 encompasses persistent and volatile media, fixed and removable media, and magnetic and semiconductor media. Storage 610 includes computer-readable memory media operable to store instructions, data, or both. Storage 610 as shown includes sets or sequences of instructions, namely, an operating system 612, and a user-controlled network configuration application 614. Operating system 612 may be a UNIX or UNIX-like operating system, a Windows® family operating system, or another suitable operating system.

In some embodiments, storage 610 is configured to store and provide executable instructions for user-controlled network configuration, as mentioned previously. As shown in FIG. 6, device 600 is configured in some embodiments to execute instructions for user-controlled network configuration using user-controlled network configuration application 614, analogous to process 300 depicted in FIG. 3. In some cases, configuration module 202 in FIG. 2 is embodied by device 600, or by user-controlled network configuration application 614.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A network configuration method, comprising:
   receiving end user input indicative of a network configuration, the end user input including:
   a plurality of service classes;
   a particular packet header field for each of the plurality of service classes, wherein a particular service class is indicated by a particular value of the particular packet header field; and
   a particular service class mixture for the plurality of service classes;
   configuring an ingress router to prioritize packets sent to the end user in accordance with the network configuration;
   configuring an egress router to queue network packets sent from the end user in accordance with the network configuration;
   monitoring a service class mixture processed by at least one of: the ingress router and the egress router;
   detecting a difference between the particular service class mixture and the service class mixture processed; and
   modifying the network configuration in accordance with the difference detected.

2. The method of claim 1, further comprising:
   validating the plurality of service classes and the particular service class mixture against service classes and mixtures indicated in a service contract.

3. The method of claim 1, wherein the particular packet header field comprises a particular field of a transport layer header.

4. The method of claim 3, wherein the particular field comprises a destination port field of the transport layer header.

5. The method of claim 3, wherein the particular field comprises a source port field of the transport layer header.

6. The method of claim 3, wherein the transport layer header comprises a transport control protocol header.

7. The method of claim 3, wherein the transport layer header comprises a user data protocol header.

8. The method of claim 3, wherein configuring the ingress router includes configuring the ingress router to prioritize packets in accordance with a destination port field of a transport layer protocol of the packets sent to the end user.

9. The method of claim 3, wherein configuring the egress router includes configuring the egress router to queue packets in accordance with a destination port field of a transport layer protocol of the packets sent to the end user.

10. A customer premises device, comprising:
    a processor; and
    a non-transitory computer readable medium including instructions that, when executed by the processor, cause the processor to perform operations comprising:
    implementing a network configuration in accordance with end user input indicating:

a plurality of service classes defined by end user input;

a particular packet header field for each of the plurality of service classes, wherein a particular service class is indicated by a particular value of the particular packet header field; and a particular service class mixture for the plurality of service classes; and processing packets in accordance with the network configuration;

monitoring a service class mixture of packets processed;

detecting a difference between the particular service class mixture and the service class mixture processed; and modifying the network configuration in accordance with the difference detected.

11. The customer premises device of claim 10, wherein the particular packet header field comprises a particular field of a transport layer header.

12. The customer premises device of claim 11, wherein the particular field comprises a destination port field of the transport layer header.

13. The customer premises device of claim 11, wherein the particular field comprises a source port field of the transport layer header.

14. A non-transitory computer readable medium including processor-executable program instructions that, when executed by a processor, cause the processor to perform operations comprising:

implementing a network configuration in accordance with end user input indicating:
a plurality of service classes defined by end user input;
a particular packet header field for each of the plurality of service classes, wherein a particular service class is indicated by a particular value of the particular packet header field; and
a particular service class mixture for the plurality of service classes;

processing packets in accordance with the network configuration;

monitoring a service class mixture of packets processed;

detecting a difference between the particular service class mixture and the service class mixture processed; and modifying the network configuration in accordance with the difference detected.

15. The non-transitory computer readable medium of claim 14, wherein the particular packet header field comprises a destination port field of a transport layer header, and wherein the transport layer header is selected from a universal datagram protocol header and a transport control protocol header.

* * * * *